UNITED STATES PATENT OFFICE.

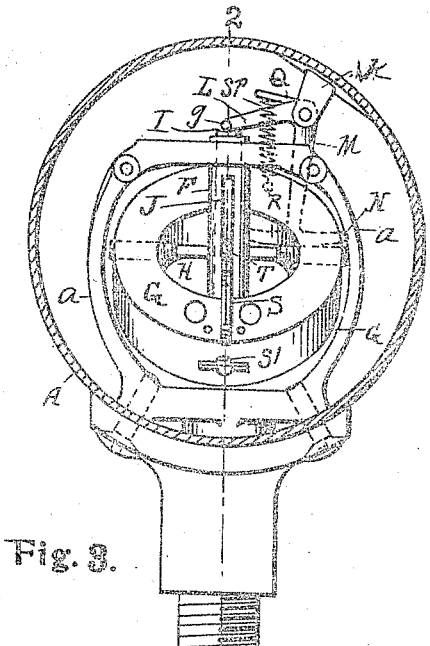

EDD C. OLIVER, OF DETROIT, MICHIGAN.

SPEEDOMETER.

1,092,590.   Specification of Letters Patent.   Patented Apr. 7, 1914.

Application filed August 22, 1910. Serial No. 578,343.

*To all whom it may concern:*

Be it known that I, EDD C. OLIVER, a citizen of the United States, residing at Detroit, county of Wayne, State of Michigan, have invented a certain new and useful Improvement in Speedometers, and declare the following to be a full, clear, and exact description of the same, such as will enable others skilled in the art to which it pertains to make and use the same, reference being had to the accompanying drawings, which form a part of this specification.

My invention relates to the method of constructing speedometers and the speedometers constructed by this method, and the object of my improvements is to provide for the cheap and convenient construction of a speedometer and to an improved speedometer in which friction is reduced and the movement of the indicating pointer shall be always proportional to the speed indicated. I accomplish this object in the device illustrated in the accompanying drawing, and constructed by the method hereinafter described.

In the accompanying drawing:—Figure 1, is an elevation of a speedometer showing equal graduations of the scale, and the pointer adapted to indicate a speed by its position on said scale. Fig. 2, is a section in a plane perpendicular to the plane passing approximately through the center of the device, as indicated by lines 2—2 in Figs. 1 and 3. Fig. 3, is a section on the line 3—3 of Fig. 2, looking from the right of the section plane. Fig. 4, is a detail view showing a supporting plate, and some of the mechanism of the speedometer.

A, A, is the casing of a speedometer.

B, is the face plate upon which are the graduations of the scale E.

C, is a shaft carrying a pointer D, which moves over the scale E, to indicate the speed.

F, is a shaft mounted in bearings in the frame a—a, secured in the casing A, A. The shaft F is to be connected to the object, the speed of which is to be measured so that said shaft shall be rotated at a rate proportional to the speed of said object.

G, indicates an annulus pivoted upon a shaft H, which shaft extends at right angles from the shaft F and is rigidly secured thereto. The annulus G surrounds the shafts F and H and is normally in a plane forming an acute angle with the shaft F, as indicated in Fig. 2.

$S^1$, is a hole bored through the periphery of the annulus G and central thereto.

d, is a tension spring secured to a pintle e on the annulus G at its outer end and at its inner end to a lug f, secured to the shaft F. The lug f is so located that the spring d, shall act by its tension to turn the annulus G toward the plane of the axis of the shaft F. The shaft is bored out to form an opening extending in from one end thereof, and is pivoted with a slot J through its wall.

I, is a rod fitting and adapted to slide in the opening in the shaft F.

T, is a rod extending at right angles from the rod I through the slot J.

S, is a cam extending from the face of the annulus G at right angles thereto, and in a plane through the center of said annulus and in position to contact the rod T.

s, is a projection formed by a slot cut in the outer edge of the cam S. The outer edge of the projection s forms a continuation of the acting edge of the cam S.

M, L, are the two arms of a bell crank lever pivoted upon a supporting plate b at K.

N, is a rack formed in the arc of a circle, the center of which is at the pivot of the lever M, L.

P, is a gear wheel on the shaft C, the teeth of the rack N engaging those of the gear wheel P.

Q, is an arm extending approximately at right angles from the arm M.

R, is a lug extending from the bearing plate b.

Sp, is a tension spring, one end of which is secured to the lug R and the other end to the outer end of the arm Q, the tension of the spring Sp tends to turn the bell crank lever M, L, to the position shown in Fig. 4, in which the rack N has acted upon the gear wheel P to turn it to its zero position. The arm L may carry a friction roller at its outer end g, where it engages against the end of the rod I, as shown in Figs. 2 and 3.

The method of constructing and the operation of the above described device is as follows:—When the shaft F is rotated, centrifugal force acts to turn the annulus G about its pivot on the shaft H, toward a position in a plane at right angles to said shaft. This force is balanced by the tension of the spring d at each point. As the plane of the annulus G changes when impelled by centrifugal force, the face of the cam S acts on the rod T to move the rod I longitudinally in the shaft F, thus pressing upon the friction wheel $g$, turning the bell crank lever M, L, about its pivot and through the rack N rotating the gear wheel F, shaft C, and pointer D, which pointer indicates the speed.

The contacting edges, or wiper-surfaces, of the cam S and rod T are so formed that they shall roll upon each other with little or no sliding so that friction heretofore incident to the action of these cams is largely obviated. The surfaces are formed approximately to shape, and the rod T and projection $s$ are made narrow and flexible enough so that they may be bent to secure the proper contour of the acting surfaces.

To secure the proper relation between the movements of the parts and the graduations of the scale, I cause the shaft F to rotate at a known speed and note the position of the parts at this speed. I then take hold of the rod T with a pair of pliers and bend it to a shape that shall cause a corresponding movement of the pointer D. This may be done for a number of points and thus the proper contour of the rod T may be easily obtained.

Experience has taught, that toward the outer portion of the cam S, its edge or wiper face frequently requires adjusting, I therefore slot the cam S to secure the projection $s$, which may be formed by bending with a pair of pliers, as above described, with reference to the rod T.

What I claim is:—

1. The combination with the index hand of a speed measure, of two members having contacting surfaces one of which is the lateral surface of a rod of sufficient rigidity to maintain its shape in the ordinary use of the instrument but sufficiently flexible to be readily bent so as to vary the longitudinal contour of said surface, means connecting said members with said index hand adapted to transmit motion from the former to the latter.

2. The combination with the index hand of a speed measure, of positioning means therefor including two members having contacting surfaces, one of which is the lateral surface of a rod of sufficient rigidity to maintain its shape in the ordinary use of the instrument but sufficiently flexible to be readily bent so as to vary the longitudinal contour of said surface, whereby the indications of the instrument may be rectified.

In testimony whereof, I sign this specification in the presence of two witnesses.

EDD C. OLIVER.

Witnesses:
    LOTTA LEE BRAY,
    ELLIOTT J. STODDARD.